(12) United States Patent
Sugai (10) Patent No.: US 9,246,609 B2
(45) Date of Patent: Jan. 26, 2016

(54) DEVICE FOR SENDING-OUT DATA IN WHICH ASSOCIATED DATA IS MULTIPLEXED WITH MAIN DATA

(75) Inventor: Toyokazu Sugai, Tokyo (JP)

(73) Assignee: MITSUBISHI DENKI KABUSHIKI KAISHA, Tokyo (JP)

( * ) Notice: Subject to any disclaimer, the term of this patent is extended or adjusted under 35 U.S.C. 154(b) by 423 days.

(21) Appl. No.: 13/269,315

(22) Filed: Oct. 7, 2011

(65) Prior Publication Data

US 2012/0030715 A1  Feb. 2, 2012

Related U.S. Application Data (63) Continuation of application No. 12/276,904, filed on Nov. 24, 2008, now Pat. No. 8,046,796, which is a continuation of application No. 09/857,491, filed as application No. PCT/JP00/05557 on Aug. 18, 2000, now abandoned.

(30) Foreign Application Priority Data

Oct. 14, 1999 (JP) .................................... 11-292211

(51) Int. Cl.
*H04N 21/435* (2011.01)
*H04H 20/42* (2008.01)
(Continued)

(52) U.S. Cl.
CPC ............. *H04H 20/42* (2013.01); *H04H 60/72* (2013.01); *H04N 21/235* (2013.01); *H04N 21/2362* (2013.01); *H04N 21/26283* (2013.01); *H04N 21/435* (2013.01); *H04N 21/84* (2013.01)

(58) Field of Classification Search
USPC ................................................... 725/54, 56
See application file for complete search history.

(56) References Cited

U.S. PATENT DOCUMENTS 5,691,986 A  11/1997 Pearlstein
5,815,662 A   9/1998 Ong
(Continued)

FOREIGN PATENT DOCUMENTS

JP  08-289266 A  11/1996
JP  08-289267 A  11/1996
(Continued)

OTHER PUBLICATIONS

ARIB STD-B10, Association of Radio Industries Businesses, "Service Information for Digital Broadcasting System", Version 1.1, pp. 8-9, Jul. 21, 1998.

(Continued)

*Primary Examiner* — Jefferey Harold
*Assistant Examiner* — Sihar Karwan
(74) *Attorney, Agent, or Firm* — Birch, Stewart, Kolasch & Birch, LLP (57) ABSTRACT

A table creating unit receives program information and an upper limit bit rate of EPG data, creates a table of EIT [current/net] on the basis of the information and upper limit bit rate, and determines the frequency of transmission of the table in consideration of the upper limit bit rate and the lower limit of the frequency of transmission of the table. A stream transmitting unit receives the table and the frequency of transmission, converts the table to stream information, and transmits a stream at a frequency determined based on the transmission frequency. Therefore, data transmission is carried out satisfying both the limit of the upper limit bit rate and the limit on the transmission frequency.

2 Claims, 7 Drawing Sheets

(51) Int. Cl.
  *H04H 60/72* (2008.01)
  *H04N 21/235* (2011.01)
  *H04N 21/2362* (2011.01)
  *H04N 21/262* (2011.01)
  *H04N 21/84* (2011.01)

(56) References Cited

U.S. PATENT DOCUMENTS

| | | | |
|---|---|---|---|
| 5,926,230 A * | 7/1999 | Niijima | H04N 5/44543 348/385.1 |
| 6,160,545 A | 12/2000 | Eyer et al. | |
| 6,314,571 B1 | 11/2001 | Ogawa et al. | |
| 6,389,593 B1 | 5/2002 | Yamagishi | |
| 6,505,347 B1 | 1/2003 | Kaneko et al. | |
| 6,658,661 B1 | 12/2003 | Arsenault et al. | |

FOREIGN PATENT DOCUMENTS

| | | |
|---|---|---|
| JP | 09-224230 A | 8/1997 |
| JP | 11-004205 A | 1/1999 |
| JP | 11-032311 A | 2/1999 |
| JP | 11-069314 A | 3/1999 |
| JP | 2000-295596 A | 10/2000 |

OTHER PUBLICATIONS

Usui, et al.: Extended Services for ISDB Television—A Program Guide Service-; ITE Technical Report; vol. 18, No. 21, pp. 19-24.

* cited by examiner

FIG.4

| TYPE OF TABLE | SDT | EIT (CURRENT/NEXT) | EIT (SCHEDULE) |
|---|---|---|---|
| PRIORITY AND REDUCTION RATE | 1 | 0 | 2.5 |

FIG.5

| TYPE OF TABLE | SDT | EIT (CURRENT/NEXT) | EIT (SCHEDULE) |
|---|---|---|---|
| PRIORITIES | 1 | 0 | 2 |
| MAIN CONSTITUENT ELEMENT | · SERVICE NAME<br>· ENTERPRISER NAME<br>· DIGITAL COPY CONTROL<br>· RECEPTION POSSIBILITY FOR EACH COUNTRY | · START TIME<br>· DURATION TIME<br>· BRIEF DESCRIPTION<br>· DETAILED DESCRIPTION | · START TIME<br>· DURATION TIME<br>· BRIEF DESCRIPTION<br>· DETAILED DESCRIPTION |
| CONSTITUENT UNIT | SERVICE IN TS | CURRENT EVENT AND NEXT EVENT | EVENTS OF SPECIFIED DAYS |

FIG.8

DEVICE FOR SENDING-OUT DATA IN WHICH ASSOCIATED DATA IS MULTIPLEXED WITH MAIN DATA

This application is a Continuation application of co-pending application Ser. No. 12/276,904, filed on Nov. 24, 2008 as a Continuation application of application Ser. No. 09/857,491, filed on Jun. 6, 2011, which was a national phase filing under 35 U.S.C. §371 of PCT International Application No. PCT/JP00/05557 which has an International filing date of Aug. 18, 2000, which designated the United States of America and was not published in English, the entire contents of each of the aforementioned applications being hereby incorporated by reference. This application also claims priority of Application No. 11-292211 filed in Japan under 35 U.S.C. §119 on Aug. 18, 2000, the entire contents of which are hereby incorporated by reference.

TECHNICAL FIELD

The present invention relates generally to a data sending-out device in which data associated with media data is produced and sent out to transmit the associated data multiplexed with the media data, and more particular to a data sending-out device in which table type data of an electronic program guide associated with broadcast programs of a digital television broadcasting is produced and sent out to transmit the associated data of the electronic program guide multiplexed with the broadcast programs.

BACKGROUND ART

A transmitting and receiving system represented by a digital television broadcasting has recently come into use. In this system, a media data signal such as a video-audio signal is digitized, and the media data signal is transmitted and received through various networks such as networks using a communication satellite and a broadcasting satellite. This system has a large number of transmission channels (or services) such as tens of channels or hundreds of channels. Therefore, it is expected that it is difficult to select a desired broadcast program from a large number of broadcast programs on a receiving side. To avoid this difficulty, a program selecting method has been proposed for the purpose of supporting the program selection. In this program selecting method, data of an electronic program guide is multiplexed with a media data signal such as a video-audio signal and is transmitted simultaneous with the media data signal, and each viewer of a program receiving side selects a desired broadcast program with reference to the electronic program guide data. This electronic program guide data is useful to select a broadcast program on the program receiving side. However, in cases where an amount of transmitted data is increased, a transmission capacity of media data such as video-audio data runs short. In this case, there is a problem that a data signal to be transmitted cannot be transmitted. To avoid this problem, it has been proposed to suppress an amount of the electronic program guide data to be transmitted.

Figure 1:
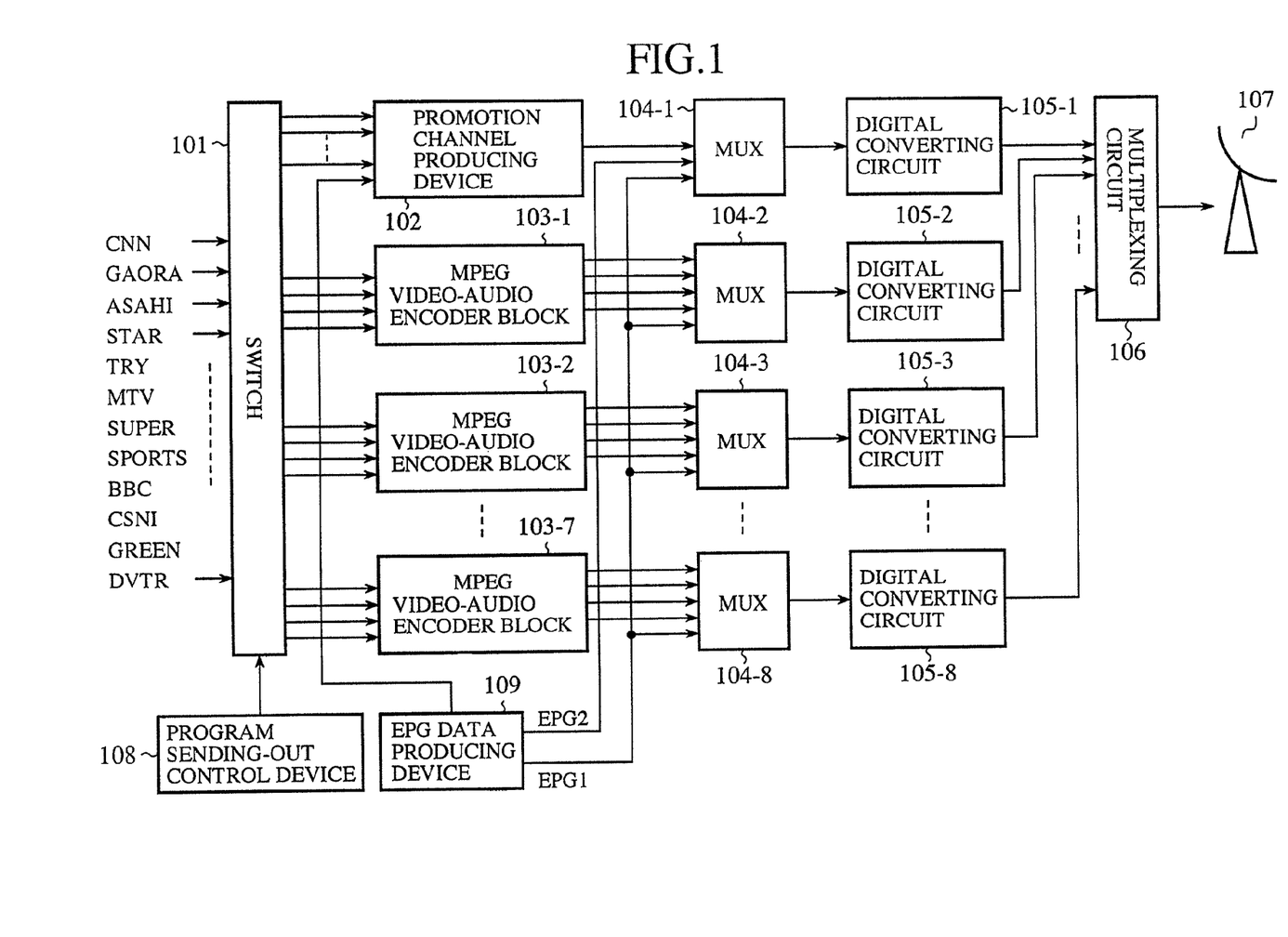
FIG. 1 is a view of the configuration of a conventional data sending-out device.

The configuration of a conventional data sending-out device disclosed in Published Unexamined Japanese Patent Application No. H8-289267 (1996) is shown in FIG. 1. First electronic program guide data (EPG1) produced in an EPG data producing unit 109 is multiplexed with program data produced in each of a plurality of multiplexers 104-2 to 104-8. In contrast, the first electronic program guide data and second electronic program guide data (EPG2) covering a wider range than that of the first electronic program guide data (EPG1) are multiplexed with promotion program data produced in a promotion channel producing unit 102. Therefore, in each normal transmission channel, electronic program guide data covering a comparatively narrow range is transmitted. In contrast, in cases where an amount of program data such as promotion program data transmitted through a promotion channel is comparatively small, a transmission allowable capacity of electronic program guide data in the promotion channel is comparatively large, and electronic program guide data covering a comparatively wide range is transmitted through the promotion channel. Accordingly, the shortage of a transmission capacity of programs due to the increase of electronic program guide data can be prevented.

However, in the conventional data sending-out device described above, electronic program guide data is divided and distributed to a plurality of channels to suppress an amount of electronic program guide data in each channel. Therefore, in cases where electronic program guide data cannot be distributed to the channels, in cases where the distribution of electronic program guide data is prohibited or in cases where the amount of electronic program guide data to be transmitted has been increased to such an extent that it exceeds a transmission allowable bit rate in each channel even though the electronic program guide data is divided and distributed to the channels, it is impossible to transmit the all amount of electronic program guide data. Therefore, there is a problem that important electronic program guide data cannot be transmitted, and there is a problem that the transmission of media data is adversely influenced.

The present invention is provided to solve the above-described problems, and the object of the present invention is to provide a data sending-out device in which important associated data such as important electronic program guide data is reliably transmitted and any adverse influence of associated data such as electronic program guide data on the transmission of media data is reliably prevented even when an amount of the associated data is increased.

DISCLOSURE OF THE INVENTION

In a data sending-out device of the present invention, associated data associated with and multiplexed with main data is produced and sent out, the associated data of a prescribed type is produced, the associated data of the prescribed type is transformed into a bit stream, and the associated data transformed into the bit stream is sent out at a sending-out rate equal to or lower than a prescribed upper limit bit rate.

Therefore, even though the transmission amount of the associated data is increased, the adverse influence of the increase of the amount of information on the transmission of the media data to be transmitted can be prevented.

In a data sending-out device of the present invention, the main data is a broadcast program, a type of tables or a plurality of types of tables based on electronic program guide information of the broadcast program are produced as the associated data, the type of tables or the types of tables are transformed into the bit stream, and the type of tables or the types of tables transformed into the bit stream are sent out at the sending-out rate equal to or lower than the prescribed upper limit bit rate.

Therefore, even though the amount of the electronic program guide information is increased, the adverse influence of the increase of the amount of information on the transmission of the media data to be transmitted can be prevented.

In a data sending-out device of the present invention, a sending-out frequency of each type of tables is calculated so as to send out the types of tables at the sending-out rate equal to or lower than the prescribed upper limit bit rate and to send out each type of tables at the sending-out frequency equal to or higher than a specific sending-out frequency of the type of tables. The types of tables transformed into the bit stream are sent out at the sending-out rate equal to or lower than the prescribed upper limit bit rate and at the sending-out frequencies equal to or higher than the specific sending-out frequencies of the types of tables.

Therefore, even though the amount of the electronic program guide information is increased, the adverse influence of the increase of the amount of information on the transmission of the media data to be transmitted can be prevented while keeping not only the prescribed upper limit bit rate but also the specific sending-out frequency of each type of tables.

In a data sending-out device of the present invention, when a type of tables or a plurality of types of tables based on electronic program guide information are produced, each type of table is produced by adjusting an amount of information in the type of table so as to send out the types of tables at the sending-out rate equal to or lower than the prescribed upper limit bit rate and to send out each type of tables at a sending-out frequency equal to or higher than a specific sending-out frequency of the type of tables.

Therefore, even though there are a plurality of types of tables of the electronic program guide information, the sending-out frequency and/or the amount of information in each type of tables are reduced in the order of ascending a priority (or a degree of importance), the types of tables are transmitted while minutely considering the priorities of the types of tables, the adverse influence of the increase of the amount of information on the transmission of the media data to be transmitted can be prevented, and information of the types of important tables can be more minutely and reliably transmitted.

In a data sending-out device of the present invention, the sending-out frequencies of the types of tables are calculated according to a plurality of priorities of the types of tables so as to be sent out at the sending-out rate equal to or lower than the prescribed upper limit bit rate and at the sending-out frequencies equal to or higher than the specific sending-out frequencies of the types of tables.

Therefore, even though there are a plurality of types of tables of the electronic program guide information, the sending-out frequency and/or the amount of information in each type of tables are reduced in the order of ascending a priority (or a degree of importance). The types of tables are transmitted while minutely considering the priorities of the types of tables, the adverse influence of the increase of the amount of information on the transmission of the media data to be transmitted can be prevented, and information of the types of important tables can be more minutely and reliably transmitted.

In a data sending-out device of the present invention, the sending-out frequencies of the types of tables are calculated according to a plurality of sending-out frequency reduction rates of the types of tables so as to be sent out at the sending-out rate equal to or lower than the prescribed upper limit bit rate and at the sending-out frequencies equal to or higher than the specific sending-out frequencies of the types of tables.

Therefore, even though there are a plurality of types of tables of the electronic program guide information, the sending-out frequency and/or the amount of information in each type of tables are reduced in the order of ascending a priority (or a degree of importance), the types of tables are transmitted while minutely considering the priorities of the types of tables, the adverse influence of the increase of the amount of information on the transmission of the media data to be transmitted can be prevented, and information of the types of important tables can be more minutely and reliably transmitted.

In a data sending-out device of the present invention, the types of tables are produced by adjusting the amounts of information in the types of tables according to a plurality of priorities of the types of tables so as to be sent out at the sending-out rate equal to or lower than the prescribed upper limit bit rate and at the sending-out frequencies equal to or higher than the specific sending-out frequencies of the types of tables.

Therefore, even though there are a plurality of types of tables of the electronic program guide information, the sending-out frequency and/or the amount of information in each type of tables are reduced in the order of ascending a priority (or a degree of importance), the types of tables are transmitted while minutely considering the priorities of the types of tables, the adverse influence of the increase of the amount of information on the transmission of the media data to be transmitted can be prevented, and information of the types of important tables can be more minutely and reliably transmitted.

In a data sending-out device of the present invention, the types of tables are produced by adjusting the amounts of information in the types of tables according to a plurality of sending-out frequency reduction rates of the types of tables so as to be sent out at the sending-out rate equal to or lower than the prescribed upper limit bit rate and at the sending-out frequencies equal to or higher than the specific sending-out frequencies of the types of tables.

Therefore, even though there are a plurality of types of tables of the electronic program guide information, the sending-out frequency and/or the amount of information in each type of tables are reduced in the order of ascending a priority (or a degree of importance), the types of tables are transmitted while minutely considering the priorities of the types of tables, the adverse influence of the increase of the amount of information on the transmission of the media data to be transmitted can be prevented, and information of the types of important tables can be more minutely and reliably transmitted.

In a data sending-out device of the present invention, any type of table which is set to a low priority is not sent out in cases where it is impossible to send out the types of tables at the sending-out rate equal to or lower than the prescribed upper limit bit rate and at the sending-out frequencies equal to or higher than the specific sending-out frequencies of the types of tables, and the other type of tables set to a high priority or the other types of tables set to high priorities are sent out at the sending-out rate equal to or lower than the prescribed upper limit bit rate and at the sending-out frequencies equal to or higher than the specific sending-out frequencies of the types of tables.

Therefore, types of tables set to high priorities can be reliably transmitted while minutely considering the priorities of the types of tables, and the adverse influence of the increase of the amount of information on the transmission of the media data to be transmitted can be prevented.

In a data sending-out device of the present invention, the type of table or the types of tables are again produced in cases where it is impossible to send out the type of table or all the types of tables at the sending-out rate equal to or lower than the prescribed upper limit bit rate or it is impossible to send out each type of tables at a sending-out frequency equal to or higher than a specific sending-out frequency of the type of tables.

Therefore, in cases where a sending-out rate of the types of tables equal to or lower than the prescribed upper limit bit rate cannot be calculated at a first calculation, the data sending-out device of the present invention is useful.

In a data sending-out device of the present invention, the amount of information in each type of table is calculated prior to the production of the type of table, and each type of table is produced by adjusting the amount of information in the type of table so as to send out the types of tables at the sending-out rate equal to or lower than the prescribed upper limit bit rate and to send out each type of tables at the sending-out frequency equal to or higher than the specific sending-out frequency of the type of tables.

Therefore, a sending-out rate of the types of tables equal to or lower than the prescribed upper limit bit rate can be calculated in a short time.

In a data sending-out device of the present invention, the amount of information in each type of table, in which the amount of the electronic program guide information is not predetermined, is detected and added to a summed value in the calculation of the amount of information performed prior to the production of the type of table, the amount of information in each type of table, in which the amount of the electronic program guide information is predetermined, is read out from a record and is added to the summed value in the calculation of the amount of information performed prior to the production of the type of table, and the amounts of information in the types of tables are calculated.

Therefore, a sending-out rate of the types of tables equal to or lower than the prescribed upper limit bit rate can be calculated in a shorter time.

BEST MODE FOR CARRYING OUT THE INVENTION

Hereinafter, the best mode for carrying out the present invention will now be described with reference to the accompanying drawings to explain the present invention in more detail.

Embodiment 1

Figure 2:
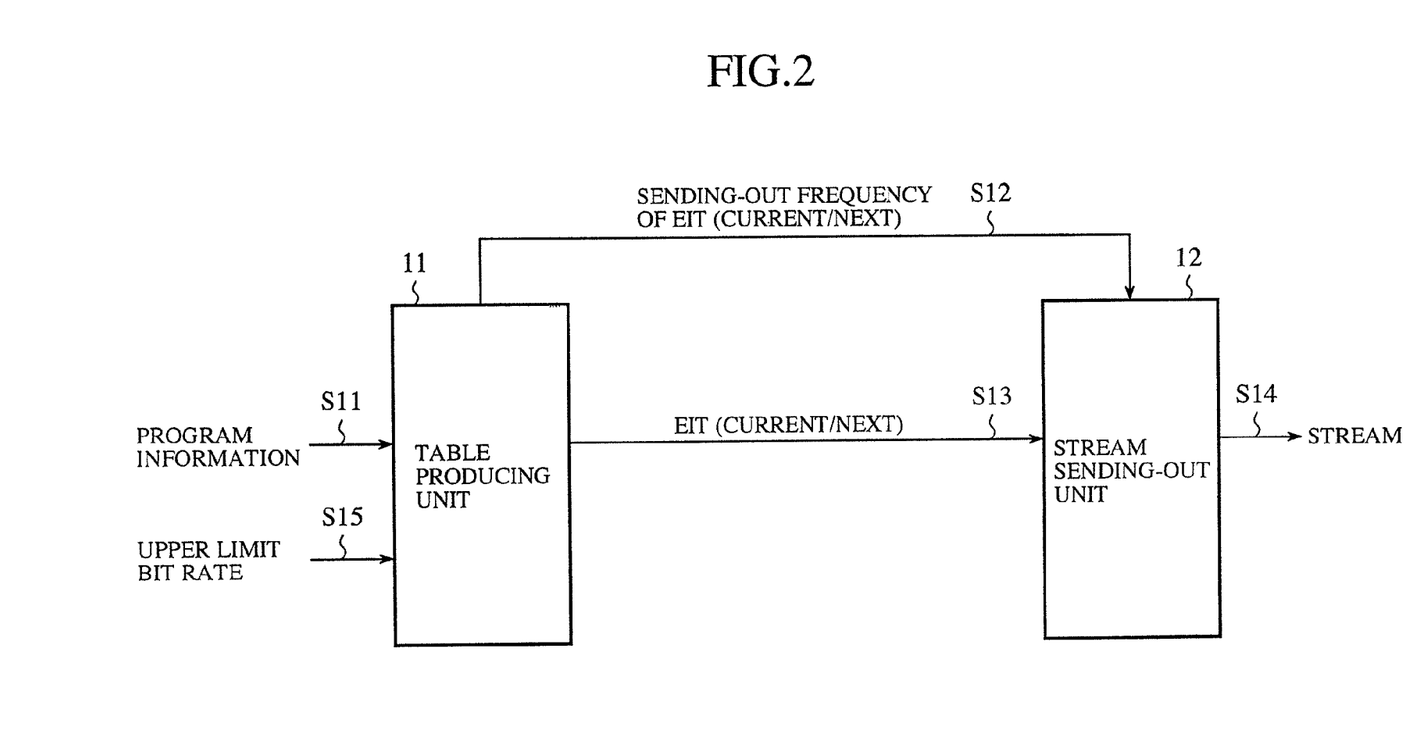
FIG. 2 is a view of the configuration of a data sending-out device according to a first embodiment of the present invention.

FIG. 2 is a view of the configuration of a data sending-out device according to a first embodiment of the present invention.

In FIG. 2, 11 indicates a table producing unit. In the table producing unit 11, program information S11 is referred, and the program information S11 is transformed into a type of tables of a transmission format which is prescribed in standards of Advanced Television System Committee (ATSC) of U.S.A or in standards of Association of Radio Industries and Businesses (ARIB) of Japan. 12 indicates a stream sending-out unit. In the stream sending-out unit 12, the type of tables produced in the table producing unit 11 are transformed into a format of a bit stream (hereinafter, called a stream) and is sent out.

Program information prescribed in standards of ARIB of Japan is initially described. "Table" is an information unit of the program information, and there are many types of tables respectively corresponding to a type of information. For example, there are a network information table (NIT) storing information associated with a transmission line network, a service description table (SDT) storing information associated with channels (or services) which are drawn up by broadcasting enterprisers, and an event information table (EIT) storing information associated with a program of a channel. Information associated with a network such as a network name and a network identifier (ID) is stored in the NIT, information associated with a service such as a service name, a name of a broadcasting enterpriser and a service identifier (ID) is stored in the SDT, and information associated with a program such as a program name, program contents, a genre and an event identifier (ID) is stored in the EIT. Also, as to the EIT, first information "an event currently broadcasted and an event planned to be broadcasted next time" and second information "events broadcasted from this day to a day after X days" are respectively stored in different types of EITs according to the standards of ARIB. A type of EIT storing the first information is called an EIT (current/next), and a type of EIT storing the second information is called an EIT (schedule). In addition, the second information is divided every four days, and divided information of four days is stored in each EIT (schedule).

Also, a sending-out frequency of each type of tables is prescribed in the standards of ARIB. For example, one NIT or more are sent out every 10 seconds, one SDT or more are sent out every 2 seconds, one EIT (current/next) or more are sent out every 2 seconds, and one EIT (schedule) or more are sent out every 10 seconds. That is, the sending-out frequency is expressed by using a lower limit rate, and it is not preferred that each type of tables are sent out at a sending-out frequency lower than the corresponding lower limit rate.

In contrast, data of an electronic program guide (called EPG data) is multiplexed with media data such as video-audio data, and a transmission line of the EPG data is fixed. Therefore, assuming that an amount of the transmitted EPG data is increased without any restriction, an amount of the media data allowed to be transmitted is reduced. To avoid this problem in the present invention, an upper limit bit rate is determined for the EPG data, and an amount of the transmitted EPG data is limited not to exceed a prescribed amount of transmission.

Next, an operation of the data sending-out device will be described below.

In this operation, the production and sending-out of program information performed according to the standards of ARIB is described as an example.

In FIG. 2, in the table producing unit 11, both program information S11 used to produce a type of tables and an upper limit bit rate S15 of EPG data are received, a type of tables S13 are produced according to the program information S11 and the upper limit bit rate S15, and a sending-out frequency S12 of the type of tables S13 is determined. In this embodiment, EIT (current/next) is adopted as an example of the type of the transmitted tables S13.

A method of determining the sending-out frequency S12 in the table producing unit 11 will be concretely described below. Because it is prescribed according to the standards of ARIB that one EIT (current/next) or more are sent out every 2 seconds, the sending-out frequency S12 can be increased in cases where the amount of data of the EIT (current/next) is small. That is, it is preferred that one EIT (current/next) is, for example, sent out every 1 second. As the sending-out frequency S12 is increased, the reliability of the reception of data of the EIT (current/next) is increased on a receiving side. Therefore, the sending-out frequency S12 is determined so as to satisfy both the upper limit bit rate S15 and a lower limit value of a sending-out frequency of the type of transmitted tables.

Also, the upper limit bit rate S15 changes with a transmission bit rate of media data such as video-audio data or is defined in advance as a fixed upper bit rate. For example, in cases where the upper limit bit rate S15 is set to 1 Mbits per second and the type of EIT (current/next) is only sent out as shown in FIG. 2, a maximum allowable sending-out frequency of EITs (current/next) is equal to one per 1 second when an amount of data of each EIT (current/next) is equal to 128 Kbytes (that is, 1 Mbits). Therefore, the sending-out frequency S12 is determined in the table producing unit 11 to a value ranging from one per 2 seconds to one per 1 second.

In contrast, in the stream sending-out unit 12, the type of tables S13 and the sending-out frequency S12 produced and determined in the table producing unit 11 are received, and the type of tables S13 are transformed into a transport stream packet. Thereafter, in cases where the data of the type of tables S13 is not altered, the type of tables S13 of the transport stream packet is sent out according to the sending-out frequency S12 determined in the table producing unit 11 at a sending-out rate equal to or lower than the upper limit bit rate S15 and at the sending-out frequency S12 equal to or higher than the lower limit value of a sending-out frequency of the type of tables S13.

As is described above, in the data sending-out device of the first embodiment, the sending-out frequency S12 of the type of tables S13 is determined in the table producing unit 11 by considering both the upper limit bit rate S15 and the lower limit value of the sending-out frequency of the type of tables S13. Accordingly, as to the sending-out of the stream, the type of tables S13 can be sent out while satisfying both the restriction of the upper limit bit rate S15 and the restriction of the sending-out frequency of the type of tables S13. As a result, even though an amount of information in the type of tables S13 of EPG data is increased, any adverse influence of the information increase on the transmission of the media data can be reliably prevented.

Embodiment 2

In the first embodiment, the sending-out frequency of the types of tables is determined in the table producing unit 11 according to the restriction of the upper limit bit rate S15. In a data sending-out device according to a second embodiment, the restriction of the upper limit bit rate S15 is satisfied by adjusting an amount of information in each table. The data sending-out device according to the second embodiment will be described below.

In each EIT, information associated with a program such as "broadcast start time" of the program, "broadcast duration period" of the program, "program name", "brief description" of the program and "detailed description" of the program" is stored to provide the information associated with the program for viewers. In this case, the information of "broadcast start time", "broadcast duration period" and "program name" is indispensable, and the importance of the information of "brief description" and "detailed description" is comparatively low. Therefore, the information of "brief description" and "detailed description" can be omitted from the EIT.

In the table producing unit 11 of the data sending-out device according to the second embodiment, in cases where an amount of information in EITs exceeds the upper limit bit rate S15 input to the table producing unit 11 when all pieces of information possible to be included in each EIT are stored in the EIT, pieces of comparatively low important information such as "brief description" and "detailed description" are omitted from the EIT in the order of ascending importance to reduce an amount of information in the EITs. For example, the lowest important information of "detailed description" is first omitted from each EIT, and the next lowest important information of "brief description" is secondly omitted from each EIT.

As is described above, in the data sending-out device of the second embodiment, in cases where a transmission bit rate (or an amount of information) of the EITs exceeds the upper limit bit rate S15, information is omitted from the EITs in the order of ascending importance. Accordingly, the transmission bit rate of the EITs can be reduced not to exceed the upper limit bit rate S15 on condition that the sending-out frequency of the EITs is maintained. As a result, even though an amount of information in the type of tables of EPG data is increased, any adverse influence of the information increase on the transmission of the media data can be reliably prevented. Also, important EPG data can be reliably transmitted.

Embodiment 3

In the first and second embodiments, the sending-out frequency S12 and/or the amount of information in one type of tables are adjusted, and the stream sending-out satisfying both the upper limit bit rate S15 and the lower limit value of the sending-out frequency of the type of tables is performed. However, in a third embodiment, as to the sending-out of a plurality of types of tables, "priority order or priority level" (hereinafter, called priority) is set for each type of table, and the sending-out frequency of each type of tables is adjusted according to the priority of the type of tables to perform the stream sending-out satisfying the upper limit bit rate S15. This data sending-out device according to the third embodiment will be described below.

Figure 3:
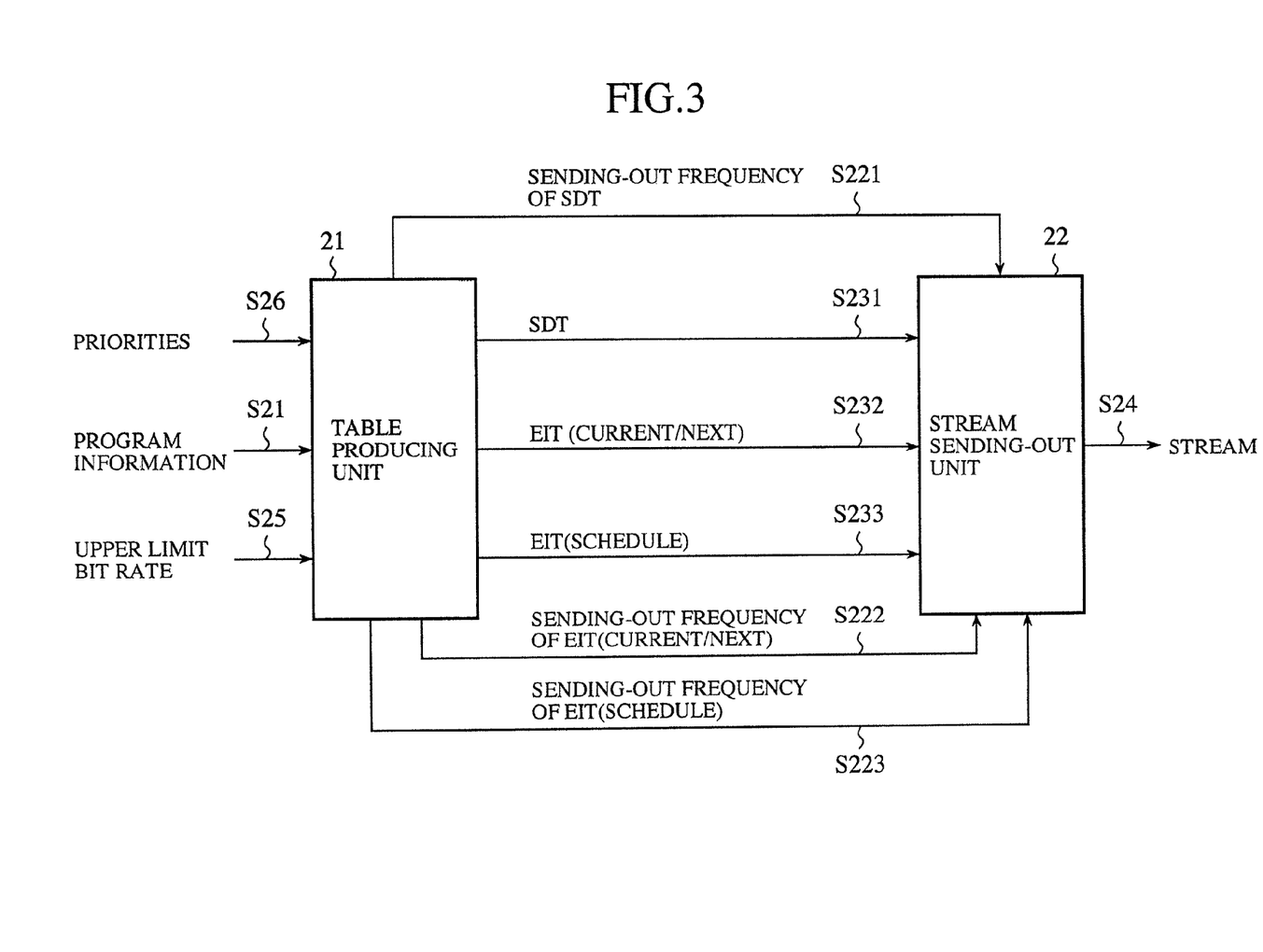
FIG. 3 is a view of the configuration of a data sending-out device according to a third embodiment of the present invention.

FIG. 3 is a view of the configuration of a data sending-out device according to the third embodiment of the present invention.

In a table producing unit 21 according to the third embodiment, a plurality of types of tables are produced. For example, an SDT 5231, an EIT (current/next) S232 and an EIT (schedule) S233 are produced, and a sending-out frequency S221 of SDTs S231, a sending-out frequency S222 of EITs (current/next) S232 and a sending-out frequency S223 of EITs (schedule) S233 are determined.

In detail, in the table producing unit 21 according to the third embodiment, in cases where the three types of tables are sent out at different sending-out frequencies, the sending-out frequencies S221, S222 and S223 of the three types of tables are determined on condition that a sum of three bit rates of the three types of tables in the data sending-out does not exceed an upper limit bit rate S25 when the three types of tables are sent out at the sending-out frequencies. In this case, a plurality of priorities S26 of the types of tables are received in the table producing unit 21 as a determination criterion, and the sending-out frequencies S221, S222 and S223 are determined according to the priorities S26. The priorities S26 indicate a priority order of each type of table. For example, because the sending-out of the SDT and the EIT (current/next) is indispensable, the same priority is assigned to the SDT and the EIT (current/next), and the priority assigned to the EIT (schedule) is lower than those assigned to the SDT and the EIT (current/next). Therefore, in cases where the sum of the bit rates of the types of tables sent out at normal sending-out frequencies exceeds the upper limit bit rate S25, it is determined in the table producing unit 21 that the sending-out frequency of the EITs (schedule) is reduced to a lower limit value. Thereafter, in cases where the sum of the bit rates of the types of tables sent out at adjusted sending-out frequencies still exceeds the upper limit bit rate S25, it is determined in the table producing unit 21 that the sending-out frequencies of the SDTs and the EITs (current/next) are reduced to lower limit values.

In a stream sending-out unit 22, the SDTs S231, the EITs (current/next) S232 and the EITs (schedule) S233 are received, and each of the group of SDTs S231, the group of EITs (current/next) S232 and the group of EITs (schedule) S233 is transformed into a transport stream (TS) packet. Thereafter, in cases where the data of the tables S231, S232 and S233 is not altered, the transport stream packets of the SDTs, the EITs (current/next) and the EITs (schedule) are sent out as a stream at the sending-out frequency S221 of the SDTs, the sending-out frequency S222 of the EITs (current/next) and the sending-out frequency S223 of the EITs (schedule) sent from the table producing unit S21.

As is described above, in the data sending-out device of the third embodiment, even though there are a plurality of types of tables to be sent out, the sending-out frequencies of the types of tables are reduced to the lower limit values in the order of ascending the priority so as to suppress the sum of the sending-out bit rates of the types of tables to a value equal to or lower than the upper limit bit rate S25. Accordingly, in cases where the sum of the bit rates of the types of tables sent out at normal sending-out frequencies exceeds the upper limit bit rate S25, as the priority (or importance) assigned to a type of table is higher, a degree of decreasing a sending-out frequency of the type of tables is lowered, and the type of tables of the high priority can be sent out at the sending-out frequency not reduced so much. As a result, even though there are a plurality of types of tables to be sent out, the media data can be reliably transmitted without any adverse influence on the transmission of the media data. Also, important EPG data of a type of importance tables can be reliably transmitted.

In the third embodiment, the sending-out frequencies of a plurality of types of tables are reduced according to the priorities S26 of the types of tables so as to satisfy both the restriction of the upper limit bit rate S25 and the restriction of the lower limit values of the sending-out frequencies prescribed according to the standards of ARIB. However, the present invention is not limited to the third embodiment. That is, a sending-out frequency of a type of tables of a low priority is set to a value lower than the lower limit value of the sending-out frequency prescribed according to the standards of ARIB. As an extreme example, a sending-out frequency of a type of table of a low priority is set to zero. Therefore, in cases where a sum of the bit rates of the types of tables exceeds the upper limit bit rate S25, it is preferred that a type of tables set to a low priority are not output or a plurality of types of tables set to low priorities are not output in the order of ascending the priority to reduce the sum of the sending-out bit rates of the types of tables.

Embodiment 4

In the third embodiment, the priorities of a plurality of types of tables are set. However, in a fourth embodiment, not only the priorities of a plurality of types of tables but also reduction rates of sending-out frequencies of the types of tables are set, and sending-out frequencies of the types of tables are determined according to the priorities and the reduction rates. A data sending-out device according to the fourth embodiment will be described below.

Figure 4:
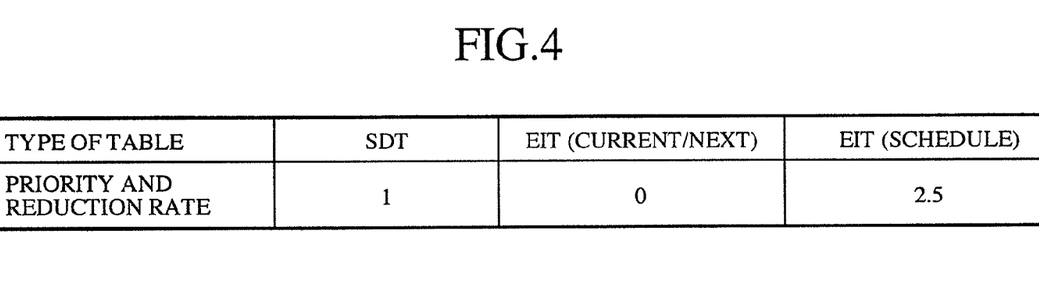
FIG. 4 is a view of a priority and reduction rate set for each type of table as an example according to a fourth embodiment of the present invention.

FIG. 4 is a view of a priority and reduction rate set for each type of table as an example according to the fourth embodiment of the present invention. As shown in FIG. 4, in the fourth embodiment, a priority and a reduction rate for each type of table are set by using a single value of a priority and reduction rate. For example, the value of the priority and reduction rate is equal to or higher than zero, and the priority of a first type of table having a first priority and reduction rate is higher than that of a second type of table having a second priority and reduction rate which is higher than the first priority and reduction rate of the first type of table. Therefore, in the fourth embodiment, the sending-out frequencies of a plurality of types of tables are not simply reduced in the order of ascending the priority, but reduction rates of sending-out frequencies of a plurality of types of tables are determined according to a plurality of values of the priority and reduction rate.

In detail, in the example of FIG. 4, the priority and reduction rate assigned to the EIT (schedule) is set to 2.5, the priority and reduction rate assigned to the SDT is set to 1, and the priority and reduction rate of the EIT (schedule) is 2.5 times of that of the SDT. Therefore, the reduction rate of the sending-out frequency of the EIT (schedule) is set so as to be 2.5 times of that of the SDT. For example, in cases where the sending-out frequency of the SDT is reduced by 10%, the sending-out frequency of the EIT (schedule) is reduced by 25%. Also, because the priority and reduction rate assigned to the EIT (current/next) is set to 0, the priority assigned to the EIT (current/next) is highest. Therefore, the sending-out frequency of the EIT (current/next) is not reduced until a sum of bit rates of a plurality of types of tables to be sent out still exceeds an upper limit bit rate even though the sending-out frequencies of the types of tables other than the EIT (current/next) are reduced to the lower limit values.

As is described above, in the data sending-out device of the fourth embodiment, values of the priority and reduction rate are assigned to the types of tables in place of the priorities. Accordingly, the sending-out frequencies of the types of tables can be flexibly and minutely reduced. As a result, even though an amount of information in EPG data of a plurality of types of tables is increased, the media data can be reliably transmitted without any adverse influence on the transmission of the media data. Also, important EPG data of a type of important tables can be reliably transmitted while minutely adjusting the sending-out frequencies of all types of tables to be transmitted.

In the fourth embodiment, the priority and the reduction rate of the sending-out frequency are indicated by one value for each type of table. However, the present invention is not limited to the priority and reduction rate. That is, it is applicable that the priority and the reduction rate be respectively assigned to each type of table. In this case, because the priority and the reduction rate are separately set for each type of table, the sending-out frequency of each type of table can be more flexibly and minutely reduced.

Also, in the fourth embodiment, the value of each reduction rate is set so as to satisfy the lower limit value of the sending-out frequency. However, the present invention is not limited to this reduction rate. For example, in cases where a priority assigned to a type of table is low, it is applicable that a reduction rate assigned to the type of table be high so as to reduce the sending-out frequency of the type of table to a value lower than the lower limit value prescribed by the standards of ARIB.

Also, in the fourth embodiment, the priority and reduction rate is set for each type of table. However, the present invention is not limited to the setting of the priority and reduction rate. That is, it is applicable that no priority be set or all types of tables be set to the same priority, and the reduction rate is only set for each type of table. In this case, when a sum of bit rates of all types of tables sent out at normal sending-out frequencies exceeds an upper limit bit rate, the sending-out frequencies of all types of tables are reduced according to the reduction rates of all types of tables. In this case, the reduction rate of the sending-out frequency for a type of low important tables is set to a high value, and the reduction rate of the sending-out frequency for a type of high important tables is set to a low value. As an extreme example, the reduction rate for a type of high important tables is set to 0. That is, no reduction is performed for the sending-out frequency of a type of high important tables. Therefore, as a degree of importance for a type of table is heightened, the reduction rate for the type of table is decreased, and the type of table can be sent out at a higher sending-out frequency. Here, in cases where the priority for each type of table is set and no reduction rate is set for each type of table, the data sending-out device is operated in the same manner as that in the third embodiment.

Embodiment 5

In the second embodiment, the restriction of the upper limit bit rate S15 is satisfied by adjusting the amount of information included in each table. However, in a fifth embodiment, in cases where there are a plurality of types of tables, priorities of the types of tables are used as a criterion of adjusting the amount of information included in each type of table. A data sending-out device according to the fifth embodiment will be described below.

Figure 5:
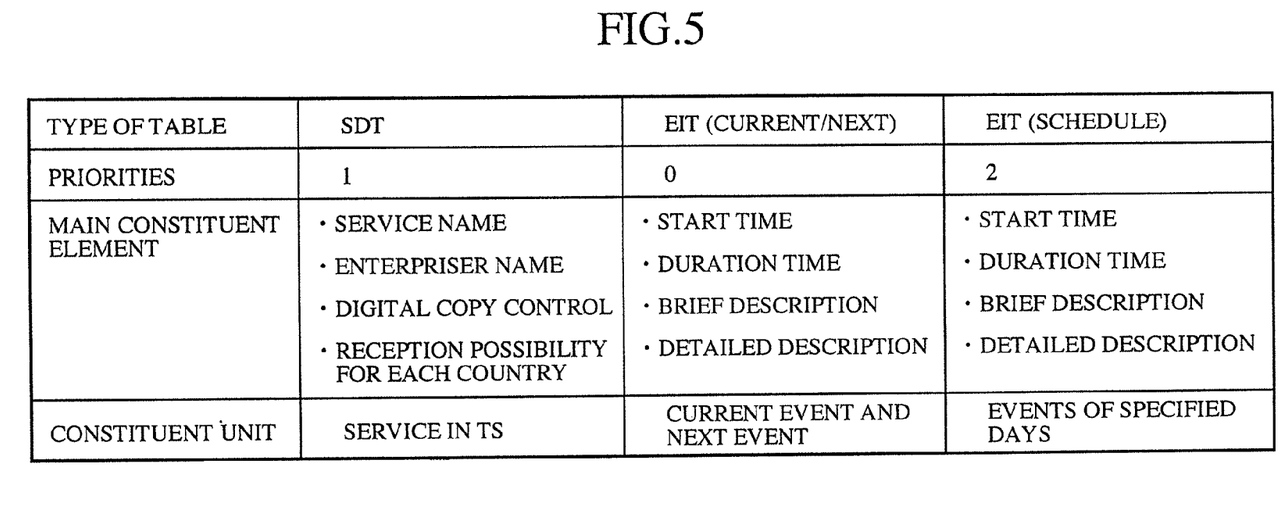
FIG. 5 is a view of a priority set for each type of table as an example according to a fifth embodiment of the present invention.

FIG. 5 is a view of a priority set for each type of table as an example according to the fifth embodiment of the present invention. As shown in FIG. 5, in the fifth embodiment, the priorities of the EIT (current/next), the SDT and the EIT (schedule) are determined in advance so as to descend the priority in that order. As main constituent elements, the SDT includes information of "service name", "enterpriser name", "digital copy control" and "reception possibility for each country", and each of the EIT (current/next) and the EIT (schedule) includes "start time of event", "duration period of event", "brief description of event" and "detailed description of event". A constituent unit of the SDT is information relating to all services included in one transport stream (TS), a constituent unit of the EIT (current/next) is a current event and a next event, and a constituent unit of the EIT (schedule) is events of specified days.

In cases where a sum of bit rates of all types of tables to be sent out exceeds the upper limit bit rate S15 when all constituent elements of the constituent unit are included in each type of table, an amount of information included in each type of table is reduced. In this fifth embodiment, omissible information of a low importance is first omitted from the EIT (schedule) set to the lowest priority in the same manner as in the second embodiment. In detail, omissible and low important information "detailed description of event" for all days is omitted from the EIT (schedule) of the lowest priority, or the information "detailed description of event" for four days from today is included in the EIT (schedule) while omitting the information "detailed description of event" for the other days from the EIT (schedule). Also, it is applicable that information be omitted from the EIT (schedule) according to the priority of time. For example, all main constituent elements "start time of event", "duration period of event", "brief description of event" and "detailed description of event" for all days after four days from today are omitted from the EIT (schedule).

Also, in cases where a sum of bit rates of all types of tables exceeds the upper limit bit rate S15 even though information included in the EIT (schedule) is omitted, an amount of information in the SDT set to a middle priority is reduced. To reduce the amount of information in the SDT, because information "digital copy control" and "reception possibility for each country" is omissible and arbitrarily added, the information "digital copy control" and "reception possibility for each country" is omitted from the SDT.

Also, in cases where a sum of bit rates of all types of tables exceeds the upper limit bit rate S15 even though information included in the EIT (schedule) and the SDT is omitted, omissible and low important information "detailed description" is omitted from the EIT (current/next) set to the highest priority, and a sum of bit rates of all types of tables is set to a value equal to or lower than the upper limit bit rate S15.

As is described above, in the data sending-out device of the fifth embodiment, when the information volume of each type of tables is adjusted according to the priorities of the types of tables so as to satisfy the restriction of the upper limit bit rate S15, omissible and low important information is omitted from a plurality of types of tables in the order of ascending the priority. Accordingly, the amount of information in the types of tables can be more flexibly and minutely reduced. As a result, even though an amount of information in EPG data of a plurality of types of tables is increased, the media data can be reliably transmitted without any adverse influence on the transmission of the media data. Also, EPG data of types of important tables can be reliably transmitted.

In the fifth embodiment, in cases where there are a plurality of types of tables, an amount of information in the types of tables is adjusted by using the priorities of the types of tables. However, the present invention is not limited to the fifth embodiment. That is, in the same manner as in the fourth embodiment, it is preferred that not only the priorities of a plurality of types of tables but also reduction rates of amounts of information in the types of tables are set to reduce the amounts of information in the types of tables according to the priorities and the reduction rates. Because not only the priorities of a plurality of types of tables but also reduction rates of amounts of information in the types of tables are set, amounts of information in the types of tables can be more flexibly and minutely reduced.

Also, it is preferred that no priority is set for all types of tables or all types of tables are set to the same priority, and the reduction rate is only set for each type of table. Because only the reduction rate is set, when a sum of bit rates of all types of tables sent out at normal sending-out frequencies exceeds the upper limit bit rate S15, the sending-out frequencies of all types of tables are reduced according to the reduction rates of all types of tables. In this case, the reduction rate of the sending-out frequency for a type of low important tables is set to a high value, and the reduction rate of the sending-out frequency for a type of high important tables is set to a low value. As an extreme example, the reduction rate for a type of high important tables is set to 0. That is, no reduction is performed for the sending-out frequency of a type of high important tables. Therefore, as a degree of importance for a type of table is heightened, the reduction rate for the type of table is decreased, and the type of table can be sent out at a higher sending-out frequency.

Also, in the fifth embodiment, the amounts of information in a plurality of types of tables are reduced according to the priorities of the types of tables so as to satisfy both the restriction of the upper limit bit rate S15 and the restriction of the lower limit values of the sending-out frequencies prescribed according to the standards of ARIB. However, the present invention is not limited to the fifth embodiment. That is, it is applicable that an information reduction rate of a type of tables of a low priority be set so as to reduce the information volume of the type of tables to zero. In cases where a sum of the bit rates of the types of tables exceeds the upper limit bit rate S15, the amount of information in the type of tables set to the low priority is reduced to zero. That is, the type of tables is not produced, and no sending-out is performed for the type of tables. Therefore, the sum of the bit rates of the types of tables sent out is reduced.

Embodiment 6

In the first to fifth embodiments, the upper limit bit rate is received in the table producing unit 11 or 21, and the sending-out frequency of each type of table and an amount of information in the type of table are determined according to the upper limit bit rate in the table producing unit 11 or 21. However, in a sixth embodiment, an upper limit bit rate is received in a stream sending-out unit. A data sending-out device according to the sixth embodiment will be described below.

Figure 6:
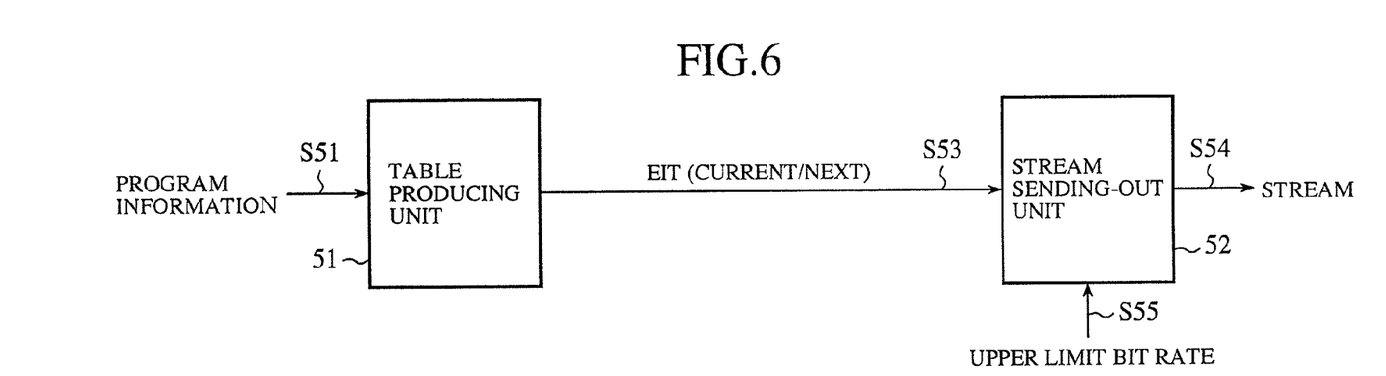
FIG. 6 is a view of the configuration of a data sending-out device according to a sixth embodiment of the present invention.

FIG. 6 is a view of the configuration of a data sending-out device according to the sixth embodiment of the present invention. In FIG. 6, 51 indicates a table producing unit. In the table producing unit 51, program information S51 is referred, and the program information S51 is transformed into a table of a transmission format which is prescribed in the standards of ATSC of U.S.A or in the standards of ARIB of Japan. 52 indicates a stream sending-out unit. In the stream sending-out unit 52, the table produced in the table producing unit 51 is transformed into a stream format and is sent out. The program information S51 is received in the table producing unit 51 to produce a type of table, and a type of table S53 is produced from the program information S51. As an example of the type of table S53, an EIT (current/next) is produced. In the stream sending-out unit 52, the table S53 produced in the table producing unit 51 and an upper limit bit rate S55 of EPG data directly sent from the outside are received, the type of table S53 is transformed into a stream S54, and a sending-out frequency S12 is determined according to the upper limit bit rate S55. Thereafter, the stream S54 is sent out at the sending-out frequency S12. Accordingly, because the unit for determining the sending-out frequency S12 of the type of tables S53 merely differs from that in the first embodiment, the same effect as that in the first embodiment can be obtained in the data sending-out device of the sixth embodiment.

Embodiment 7

In the sixth embodiment, the upper limit bit rate S55 is only given to the stream sending-out unit 52 as a judging criterion of a sending-out frequency of a type of tables. However, in a seventh embodiment, "priority" relating to the sending-out of a plurality of types of tables is set for a stream sending-out unit, and the sending-out frequency of each type of tables is adjusted according to the priority of the type of tables to perform the stream sending-out satisfying an upper limit bit rate. This data sending-out device according to the seventh embodiment will be described below.

Figure 7:
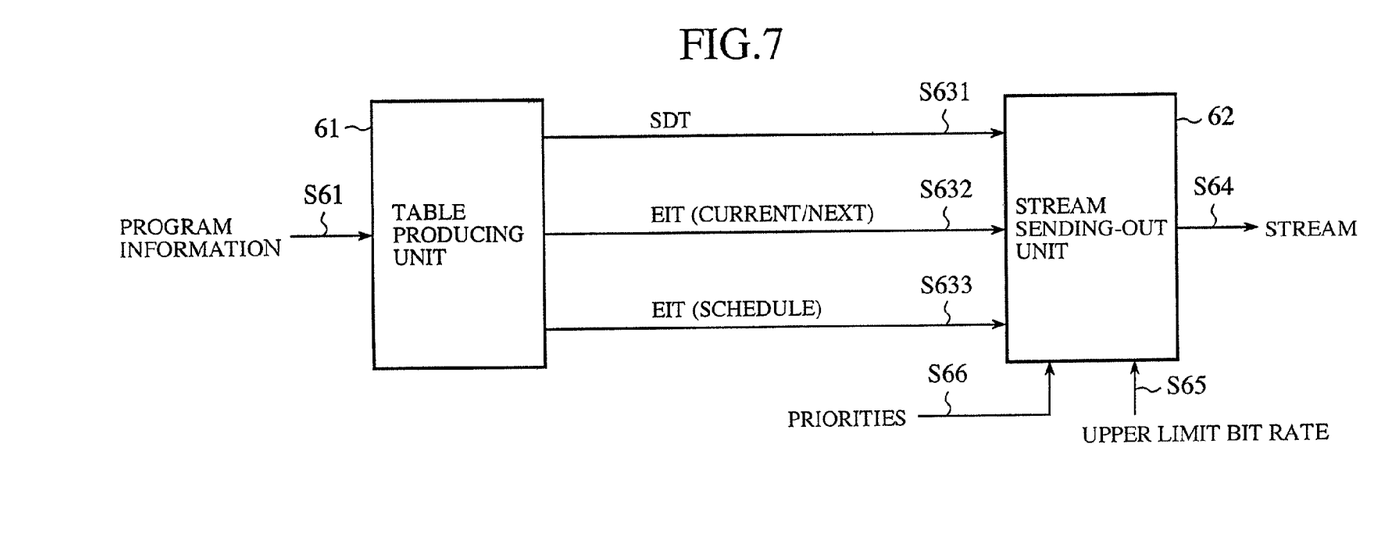
FIG. 7 is a view of the configuration of a data sending-out device according to a seventh embodiment of the present invention.

FIG. 7 is a view of the configuration of a data sending-out device according to the seventh embodiment of the present invention.

In this seventh embodiment, in the same manner as in the third embodiment, a plurality of types of tables are produced in a table producing unit 61. For example, an SDT S631, an EIT (current/next) S632 and an EIT (schedule) S633 are produced, and the SDT S631, the EIT (current/next) S632 and the EIT (schedule) S633 are received in a stream sending-out unit 62, each type of tables are transformed into a transport stream (TS) packet, and a sending-out frequency of the SDT S631, a sending-out frequency of the EIT (current/next) S632 and a sending-out frequency of the EIT (schedule) S633 are determined according to an upper limit bit rate S65 and priorities S66 received from the outside in the same manner as in the third embodiment. Thereafter, the transport stream (TS) packet of each type of tables is sent out at the corresponding sending-out frequency in cases where data of the type of tables is not altered.

As is described above, in the seventh embodiment, the unit for determining the sending-out frequency of each type of tables merely differs from that in the third embodiment, the priorities S66 of the types of tables are set, the priorities S66 are received in the stream sending-out unit 62, and the sending-out frequency of each type of tables is determined in the stream sending-out unit 62 according to the priorities S66. Accordingly, the same effect as that in the third embodiment can be obtained in the data sending-out device of the seventh embodiment.

In the seventh embodiment, the sending-out frequency of each type of tables is determined in the stream sending-out unit 62 according to the priorities S66, and the sending-out frequency of each type of tables is reduced according to the determination so as to satisfy both the restriction of the upper limit bit rate for all types of tables and the restriction of the lower limit value of each sending-out frequency prescribed by the standards of ARIB. However, the present invention is not limited to this seventh embodiment. That is, as is described in the third embodiment, a sending-out frequency of a type of tables of a low priority is set to a value lower than the lower limit value of the sending-out frequency prescribed according to the standards of ARIB. As an extreme example, a sending-out frequency of a type of tables of a low priority is set to zero. Therefore, in cases where a sum of the bit rates of the types of tables to be sent out exceeds the upper limit bit rate S65, it is preferred that no sending-out of a plurality of types of tables set to low priorities is performed in the order of ascending the priority to reduce the sum of the bit rates of the types of tables.

Embodiment 8

Next, there is a probability that the sending-out of a plurality of types of tables cannot be performed in the sixth or seventh embodiment so as to satisfy the restriction of an upper limit bit rate sent from the outside. In this case, in an eighth embodiment, a stream producing unit instructs a table producing unit to again produce a plurality of types of tables. A data sending-out device according to the eighth embodiment will be described below.

Figure 8:
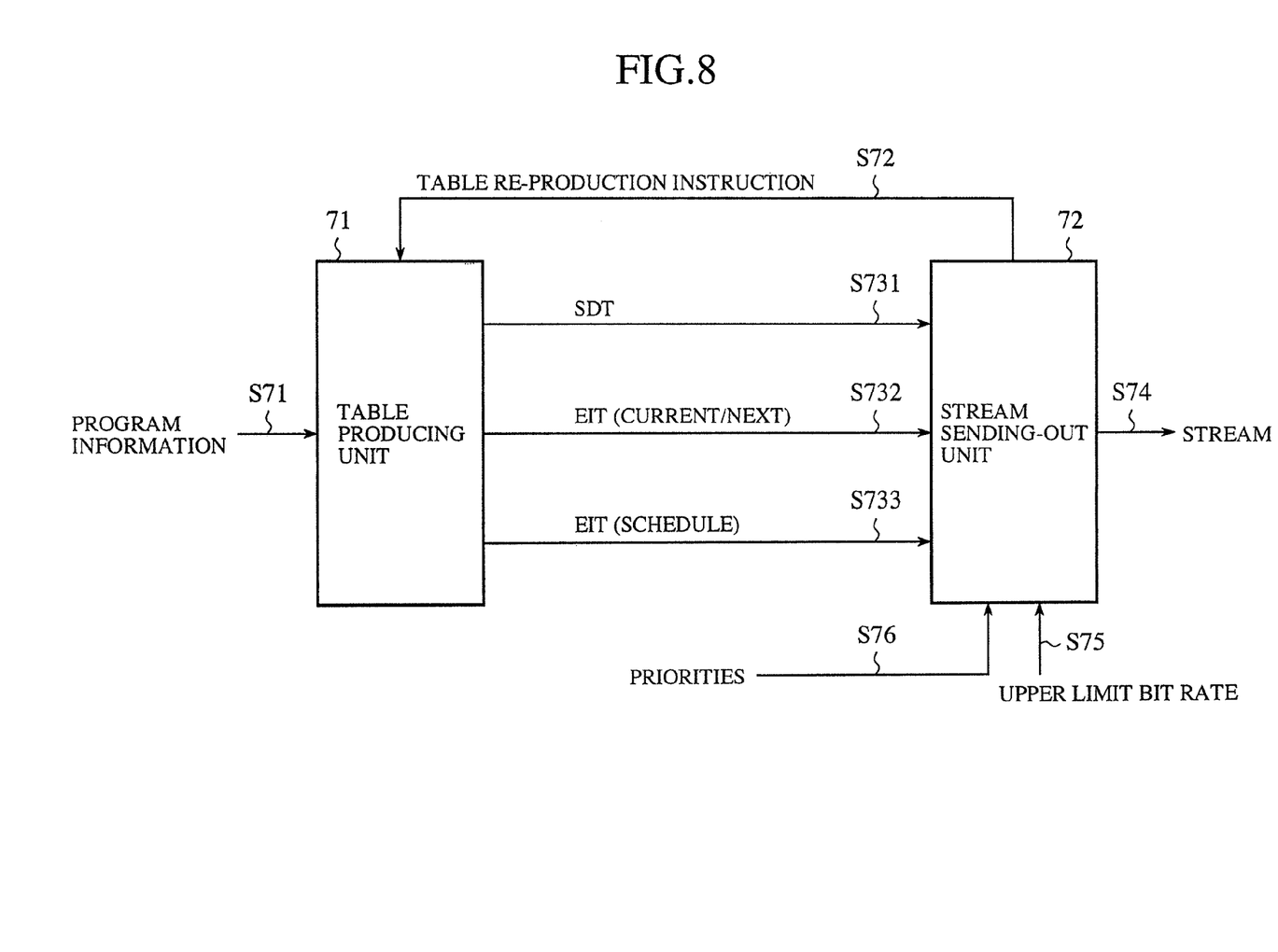
FIG. 8 is a view of the configuration of a data sending-out device according to an eighth embodiment of the present invention.

FIG. 8 is a view of the configuration of a data sending-out device according to the eighth embodiment of the present invention.

In FIG. 8, in a stream sending-out unit 72, an upper limit bit rate S75 and priorities S76 of a plurality of types of tables S731, S732 and S733 are received, a sending-out frequency of each type of tables is determined according to the upper limit bit rate S75 and the priorities S76, and a stream obtained by transforming each type of tables S731, S732 or S733 is sent out at the corresponding sending-out frequency. In cases where a sum of bit rates of the streams S74 exceeds the upper limit bit rate S75 when the sending-out frequency of each type of tables is determined, the stream sending-out unit 72 considers the priorities S76 of the types of tables S731, S732 and S733 to produce a table re-production instruction S72 and sends the table re-production instruction S72 to a table producing unit 71 so as to make the table producing unit 71 again produce a plurality of types of tables S731, S732 and S733.

The table re-production instruction S72 will be described. For example, in cases where the priorities S76 of the types of tables are set in the same manner as those shown in FIG. 5, the instruction S72 indicates the re-production of a plurality of types of tables according to the priorities S76. That is, the stream sending-out unit 72 instructs the table producing unit 71 to omit information "detailed description" from the EIT (schedule) set to the lowest priority or to omit information of events (or programs) to be broadcasted on specified days from the EIT (schedule).

As is described above, in the data sending-out device of the eighth embodiment, in cases where the sending-out frequencies of the types of tables cannot be set so as to satisfy both the restriction of the upper limit bit rate and the restriction of the lower limit values of the sending-out frequencies of the types of tables when the sending-out frequencies of the types of tables are determined in the stream sending-out unit 72, the stream sending-out unit 72 sends the table re-production instruction S72 to the table producing unit 71 to make the table producing unit 71 again produce the types of tables set to the low priorities in which amounts of information are reduced. Accordingly, a sum of bit rates of the types of tables to be sent out can be reduced by the re-production of the types of tables.

In particular, as is described in the eighth embodiment, in cases where the upper limit bit rate S75 is not input to the table producing unit 71, because it is impossible in the table producing unit 71 to ascertain a sum of amounts of information in the types of tables satisfying the upper limit bit rate S75, the data sending-out device of the eighth embodiment is useful.

Embodiment 9

In the above described embodiments, each table producing unit has a function of producing the types of tables (or one type of tables) or a function of determining the sending-out frequencies of the types of tables (or one type of tables). In a ninth embodiment, a sum of amounts of information in a plurality of types of tables is calculated in a table producing unit prior to the table production. A data sending-out device of the ninth embodiment is described.

FIG. 9(A) and FIG. 9(B) are respectively flow charts, each of which shows a calculation procedure of an amount of information in each type of table in a table producing unit of a data sending-out device according to a ninth embodiment of the present invention.

Figure 9:
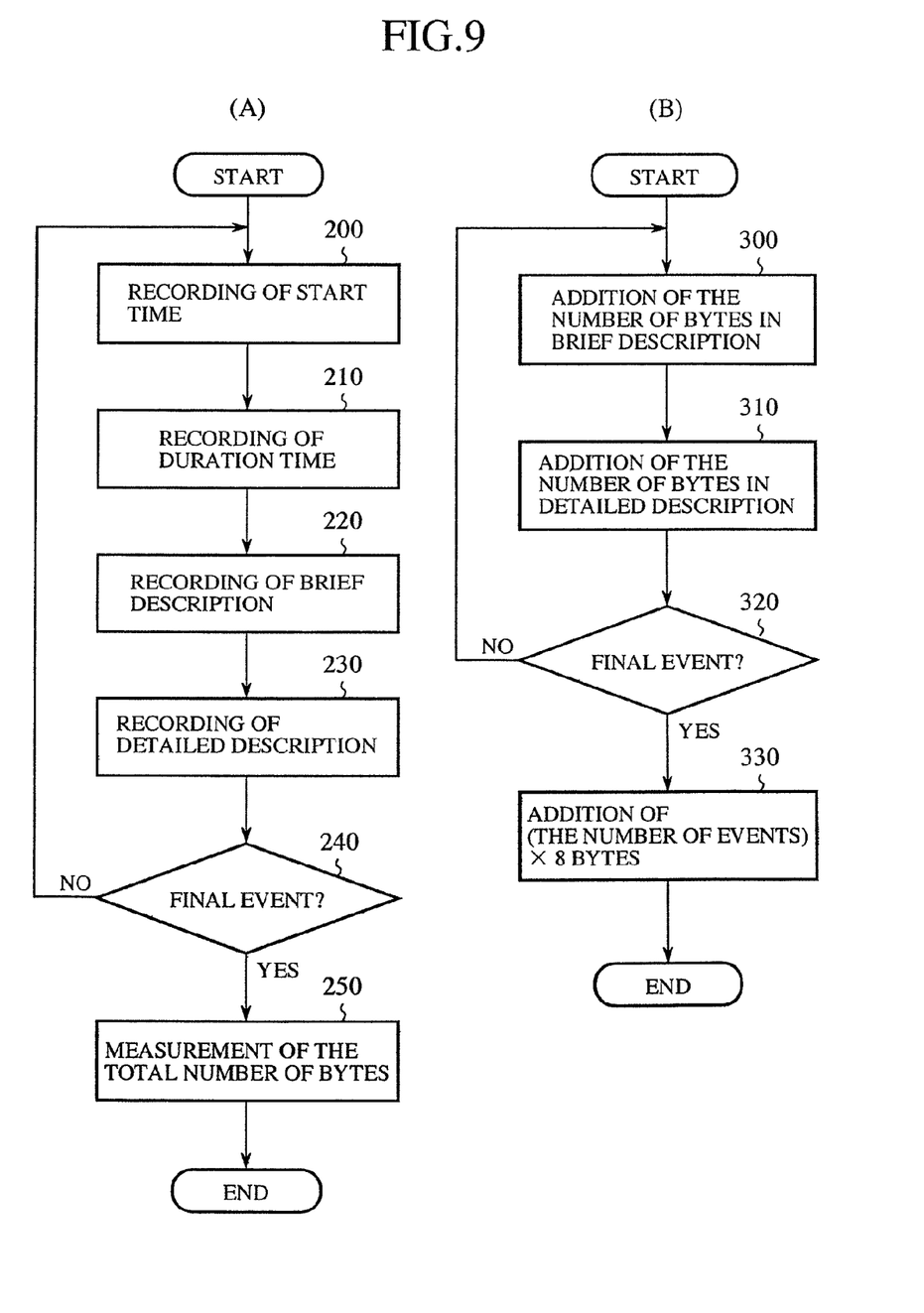
FIG. 9 is a flow chart showing a calculation method of an amount of information in each type of table according to a ninth embodiment of the present invention.

For example, in cases where a sending-out bit rate of an EIT (schedule) is calculated, it is necessary to know a data size of the EIT (schedule). In cases where constituent elements of the EIT (schedule) are limited to "start time", "duration period", "brief description of program" and "detailed description of program", as shown in FIG. 9 (A), the table information "start time", "duration period", "brief description of program" and "detailed description of program" are normally recorded in a buffer in the processing of steps 200 to 240 for each event, and the total number of bytes of the table information recorded in the buffer is finally measured in a step 250.

However, to know the data size of the table information, it is not necessary to actually write the table information in the buffer in the steps of the table production.

That is, as shown in FIG. 9(B), the number of bytes in the table information "brief description of program" and the number of bytes in the table information "detailed description of program" are examined and added to a summed value in steps 300, 310 and 320 for each event. After the calculation of the summed value of the number of bytes for all events, the number of bytes equal to "the number of events ×8 bytes" is added to the summed value in a step 330 in cases where the types of tables are produced according to the standards of ARIB. That is, because it is prescribed in the standards of ARIB to record the table information "start time" at 5 bytes for each event and to record the table information "duration period" at 3 bytes for each event, the number of bytes in the table information "start time" and "duration period" is equal to "the number of events ×8 bytes".

As a result, a processing time of recording the table information "brief description of program" and "detailed description of program" in the buffer as shown in FIG. 9(A) considerably differs from a processing time of adding the number of bytes in the table information "brief description of program" and "detailed description of program" to the summed value as shown in FIG. 9(B). Also, a calculation repetition of the table information "start time" and "duration period" for a plurality of events can be omitted, and the byte calculation of the table information "start time" and "duration period" is simplified because the number of bytes is known in advance in the standards of ARIB. Therefore, the processing time for the procedure shown in FIG. 9(B) is considerably shortened as compared with the processing time for the procedure shown in FIG. 9(A). Therefore the processing time can be considerably shortened. Accordingly, in cases where the amounts of information in the types of tables are adjusted, for example, in the second embodiment, the processing time in the table producing unit can be shortened by calculating in advance the data size of each type of table according to the processing shown in FIG. 9(B).

As is described above, in the data sending-out device of the ninth embodiment, the number of bytes in the table information "brief description of program" and "detailed description of program" is examined and added to a summed value, and the number of bytes in the table information "start time" and "duration period" prescribed in the standards of ARIB is calculated and added to the summed value. Accordingly, the processing time can be considerably shortened as compared with a case where all pieces of information are recorded and the total number of bytes is finally measured.

In the first to ninth embodiments, the upper limit bit stream and the priorities of the types of tables are input to the table producing unit or the stream sending-out unit, the amounts of information in the types of tables are reduced in the table producing unit or the stream sending-out unit by using (or not using) the priorities of the types of tables and/or reduction rates of the types of tables to make a sum of bit rates of all types of tables be equal to or lower than the upper limit bit rate, and the amount of information in each type of tables is reduced or the sending-out frequency of each type of tables is reduced. However, the present invention is not limited to the first to ninth embodiments. That is, it is preferred that a control unit (not shown) is arranged in addition to the table producing unit and the stream sending-out unit, the upper limit bit stream and the priorities of the types of tables are input to the control unit, the control unit sends the reduction rates of the amounts of information in the types of tables to the table producing unit, and the control unit sends the sending-out frequencies of the types of tables to the stream sending-out unit.

Also, in the first to ninth embodiments, the sending-out of both broadcast program information denoting main data and electronic program guide information denoting data associated with the main data are described as an example. However, the present invention is not limited to the broadcast program information and the electronic program guide information. That is, in the broadcast of data such as a data broadcasting, in cases where associated data associated with broadcasting data to be broadcasted is sent out to transmit the associated data multiplexed with the broadcasting data, a data sending-out device for the associated data can be applied. In this case, the same effect as that in the first to ninth embodiments can be obtained.

INDUSTRIAL APPLICABILITY

As is described above, the present invention relates generally to a data sending-out device in which data associated with media data is produced and sent out to transmit the associated data multiplexed with the media data, and more particularly to a data sending-out device in which table type data of an electronic program guide associated with broadcast programs of a digital television broadcasting is produced and sent out to transmit the associated data of the electronic program guide multiplexed with the broadcast programs. Even though an amount of information in the associated data such as electronic program guide data is increased, the important electronic program guide data can be transmitted, and the data sending-out device according to the present invention is appropriate for the prevention of the adverse influence of the increase of the amount of information on the transmission of the media data to be transmitted.

What is claimed is:

1. A device, comprising:
a multiplexer that multiplexes contents of a currently-scheduled broadcast program with multiple types of event information tables (EITs), the multiplexed EITs containing information associated with a plurality of broadcast programs, a first type of the multiplexed EITs containing information of a present event for a broadcast program scheduled in a current duration, a second type of the multiplexed EITs containing information of an event for a broadcast program scheduled in a later duration, and a third type of the multiplexed EITs containing information of an event for a broadcast program scheduled in a duration which is later than both the current duration and the later duration, wherein the third type of the multiplexed EITs is optionally multiplexed; and
a sending-out unit that transmits the contents multiplexed with the multiple types of EITs,
wherein the multiplexer and the sending-out unit perform the multiplexing and transmitting operations, respectively, in such manner to ensure that each of the multiple types of EITs achieves a sending-out frequency that is equal to or higher than a corresponding one of a plurality of prescribed sending-out frequencies that are set in the device for the multiple types of EITs, respectively, the plurality of prescribed sending-out frequencies including: a first prescribed sending-out frequency, and a second prescribed sending-out frequency which is less than the first prescribed sending-out frequency,
wherein the first prescribed sending-out frequency is set in the device for the first type of the multiplexed EITs, and the second prescribed sending-out frequency is set in the device for the second type of the multiplexed EITs, and
wherein each of the prescribed sending-out frequencies corresponds to a specific interval of time by every passage of which the corresponding type of the multiplexed EITs is transmitted during the transmitting operation by the sending-out unit,
wherein a transmission bit rate of the multiple types of EITs is prevented from exceeding an upper limit bit rate.

2. A method, comprising:
multiplexing contents of a currently-scheduled broadcast program with multiple types of event information tables (EITs), the multiplexed EITs containing information associated with a plurality of broadcast programs, a first type of the multiplexed EITs containing information of a present event for a broadcast program scheduled in a current duration, a second type of the multiplexed EITs containing information of an event for a broadcast program scheduled in a later duration, and a third type of the multiplexed EITs containing information of an event for a broadcast program scheduled in a duration which is later than both the current duration and the later duration, wherein the third type of the multiplexed EITs is optionally multiplexed; and
transmitting the contents multiplexed with the multiple types of EITs,
wherein the multiplexing and the transmitting are performed in such manner to ensure that each of the multiple types of EITs achieves a sending-out frequency that is equal to or higher than a corresponding one of a plurality of prescribed sending-out frequencies that are set in a device for the multiple types of EITs, respectively, the plurality of prescribed sending-out frequencies including: a first prescribed sending-out frequency, and a second prescribed sending-out frequency which is less than the first prescribed sending-out frequency,
wherein the first prescribed sending-out frequency is set in the device for the first type of the multiplexed EITs, and the second prescribed sending-out frequency is set in the device for the second type of the multiplexed EITs, and
wherein each of the prescribed sending-out frequencies corresponds to a specific interval of time by every passage of which the corresponding type of the multiplexed EITs is transmitted during the transmitting operation by the device,
wherein a transmission bit rate of the multiple types of EITs is prevented from exceeding an upper limit bit rate.

* * * * *